Aug. 13, 1957 A. J. HIRST 2,802,662
RESILIENT MOUNTING FOR RAIL AND LIKE VEHICLES
Filed April 16, 1954 3 Sheets-Sheet 1

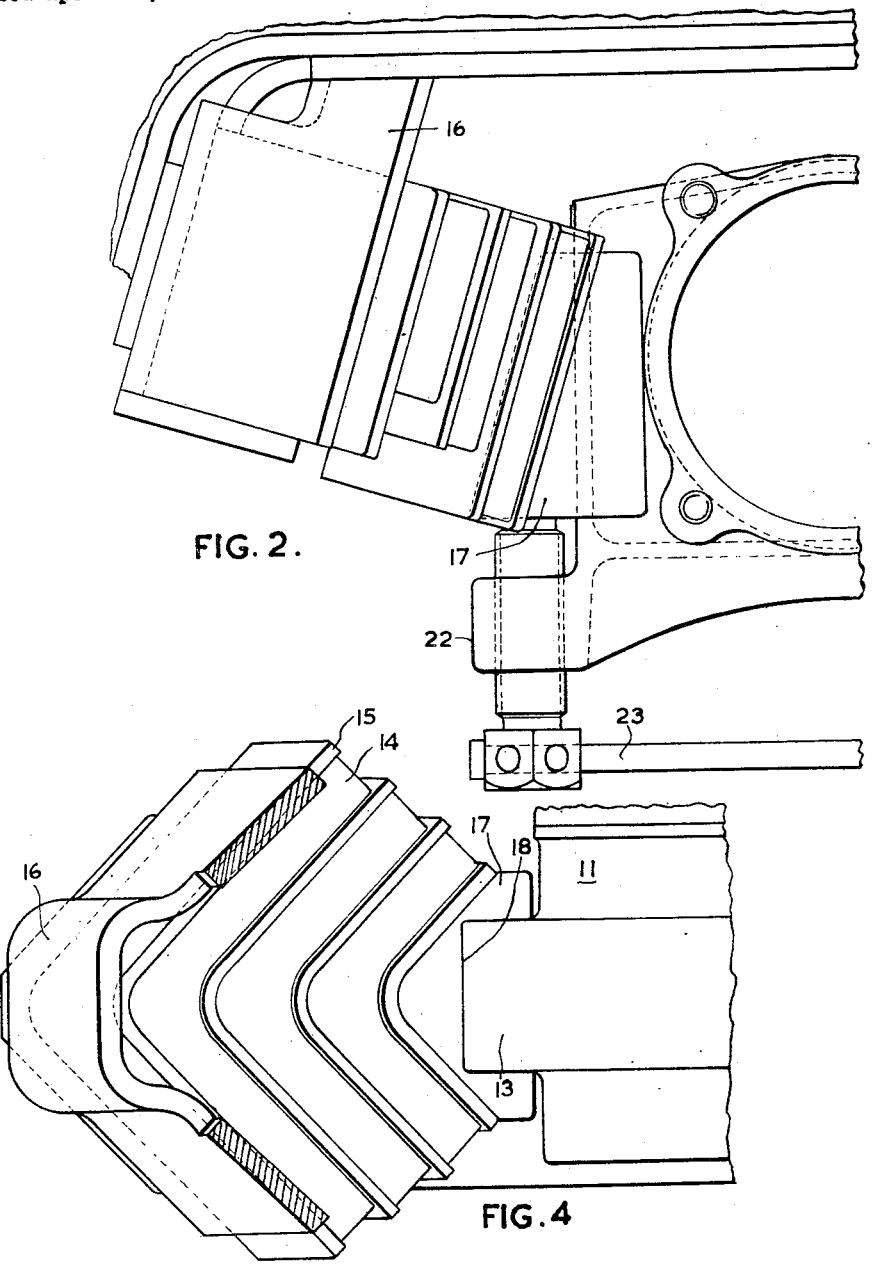

United States Patent Office 2,802,662
Patented Aug. 13, 1957

2,802,662

RESILIENT MOUNTING FOR RAIL AND LIKE VEHICLES

Archie John Hirst, Leicester, England, assignor to Metalastik Limited, Leicester, England, a British company Application April 16, 1954, Serial No. 423,658

12 Claims. (Cl. 267—3)

This invention relates to resilient mountings for rail and like vehicles, and is especially concerned with mountings for use between the body or chassis frame and the wheel axle-boxes of such vehicles.

It is an object of the invention to provide such a mounting including compound resilient elements between the body or chassis frame of the vehicle and each wheel axle-box, each compound resilient element comprising angular rubber blocks with correspondingly shaped metal leaves to which the rubber blocks are surface bonded, the wings of which metal leaves and rubber blocks are inclined to one another at an angle not substantially exceeding a right angle, said compound resilient elements being arranged in the form of a V spring and being connected to the axle-box at the apex of the V, the compound resilient elements forming the arms of the V and being upwardly and outwardly directed for connection to the body or chassis frame of the vehicle.

Further objects of the invention will be apparent from the following description of an embodiment of the invention which is illustrated by way of example in the accompanying drawings in which:

Figure 2 is an elevation, to a larger scale, of a part of Figure 1.

Figure 4 is a plan of part of the mounting shown in Figure 2.

Figure 1:
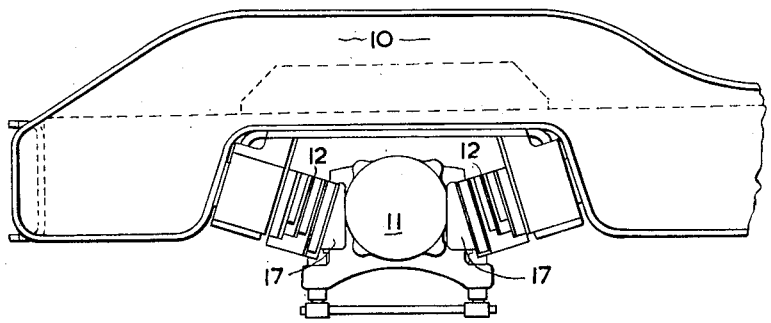
Figure 1 is an elevation of part of a bogie of a railway vehicle showing a resilient mounting according to the invention.

In the resilient mounting shown a side member 10 of a bogie of a railway vehicle is supported from an axle-box casting 11 by two compound resilient elements 12. An external rib or flange 13 projects from the axle-box 11 and provides a location for the inner ends of the compound resilient elements. The term "inner" is used in the sense of towards the axle-box whereas the term "outer" refers to away from the axle-box.

Each compound resilient element 12 comprises three angular or chevron-shaped rubber blocks 14 whose angular surfaces are bonded to correspondingly shaped metal leaves 15. The wings or edges of the metal leaves 15 extend laterally and vertically beyond the free or unbonded faces of the rubber blocks 14. The angle between the wings of the rubber blocks 14 and metal leaves 15 is a right angle or less, and the junction between the wings is preferably curved, the radii of curvature of each rubber block 14 and metal leaf 15 being equal. In this way axial compression of the whole compound resilient element 12 is equalized at widely distributed points (e. g. at the centre as well as in the region of the wings of the rubber blocks 14).

The compound resilient elements 12 are arranged fore and aft of the axle-box casting 11 and are inclined upwardly and outwardly with respect to the axle-box, forming a V spring with the axle box at its apex. The inclination of the compound resilient elements 12 causes the rubber blocks 14 to be stressed by vertical loads in both shear and compression.

The resultant force through the centre of pressure of each rubber block 14 is therefore not in the compression direction (that is the direction normal to the bonded faces of the rubber block 14 and metal leaves 15) but inclined to it at an angle. In the present embodiment the angle is approximately 14½ degrees.

Under load, the resultant forces in all the rubber blocks of a compound resilient element 12 will lie in the same straight line, that is the line of the resultant thrust in the complete compound resilient element 12. Since the resultant force in each rubber block 14 passes through its centre of pressure, the centres of pressure of all the rubber blocks of the compound resilient element must lie on the line of the resultant thrust, and if they do not when the metal plates 15 are in their normal parallel positions then canting of the metal plates 15 will take place to bring the centres of pressure into line.

Figure 3:
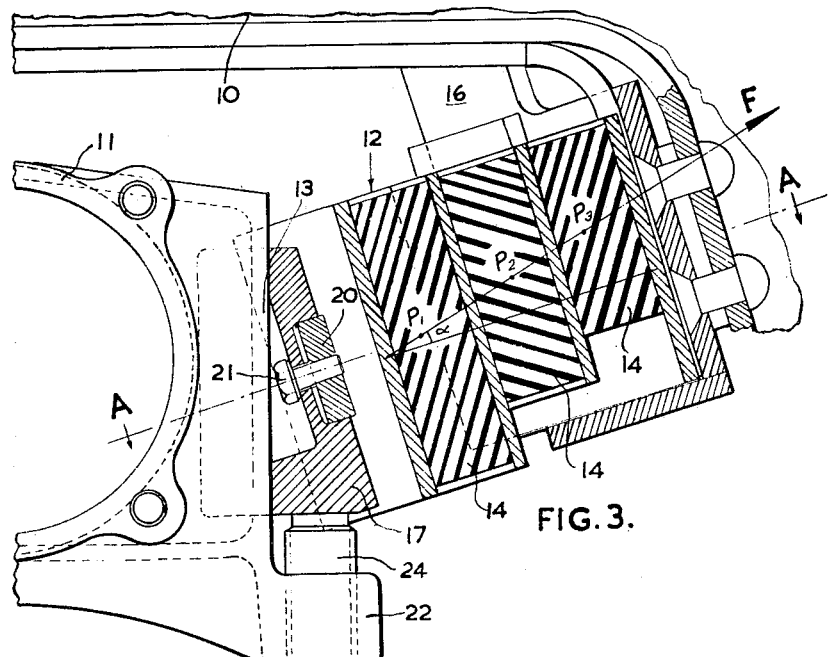
Figure 3 is a sectional elevation to a larger scale of another part of Figure 1.

In order to prevent this canting of the metal plates the outer rubber blocks 14 are each staggered or offset in a vertical direction with respect to the adjacent inner rubber block 14, so that their centres of pressure under load will lie on the line of the resultant thrust in the compound resilient element 12. As shown in Figure 3, the resultant thrust F is inclined at an angle, α, about 14½ degrees, to the normal through the rubber blocks 14, and passes through the centres of pressure P1, P2, P3 of the rubber blocks 14. It will be understood that this condition can only be achieved at one load, since the configuration and mounting of the compound resilient elements is fixed, but if, as in a main line passenger coach, the variation in passenger load is small compared with the tare load the slight changes in load make little difference to the direction of the resultant thrust F.

If the load changes are likely to be considerable, as for example in a lightweight passenger carriage, the amount of offset of the rubber blocks should be calculated for the mean load likely to be encountered. The canting produced at other loads will not then be excessive.

Figure 6:
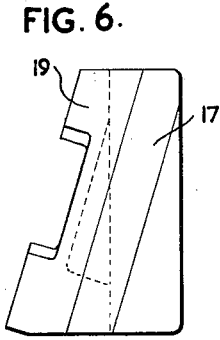
Figure 6 is an elevation of an adaptor block for the mounting.
Figure 7:
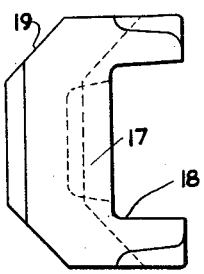
Figure 7 is a plan of the adaptor block shown in Figure 6.
Figure 5:
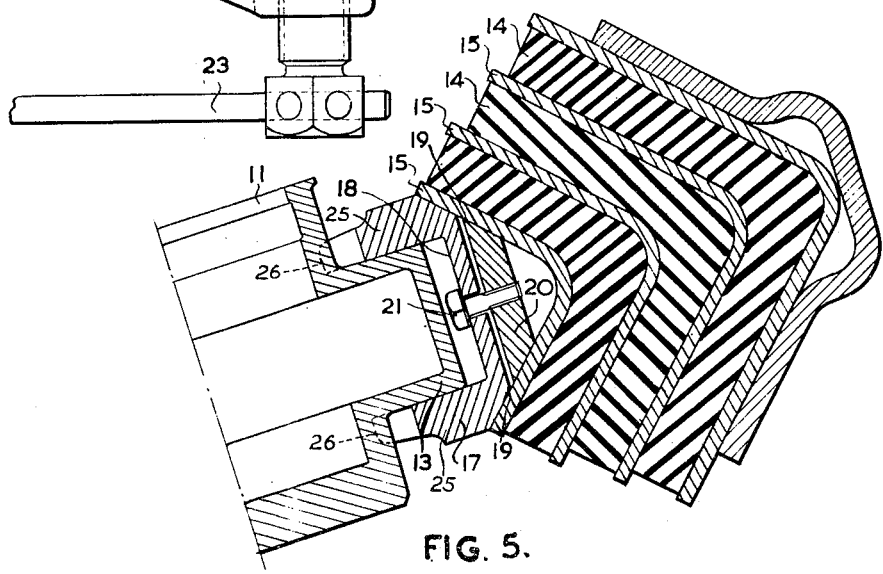
Figure 5 is a section in the line A—A of Figure 3.

Each compound resilient element 12 is secured at one end by an attachment bracket 16 to the side member 10 and at its other end to an adaptor block 17 for connection to the axle-box casting 11. As shown in Figures 5 and 6, each adaptor block 17 has a groove 18 to receive the projecting rib or flange 13 of the axle-box casting 11, and mutually inclined surfaces 19 adapted to fit closely against the inner metal leaf 15 of a compound resilient element. A bridge piece 20 is secured, for example by welding, to the inner metal leaf 15 and is drilled and screw threaded to engage a bolt 21 passing through the adaptor block 17 for securing the compound resilient element 12 to the adaptor block 17.

Figure 8:
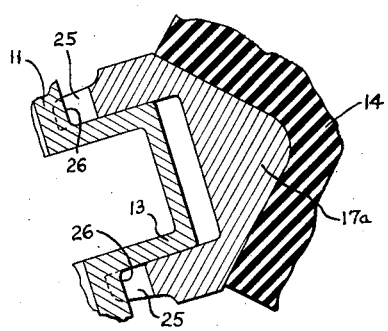
Figure 8 is a fragmentary view like Figure 5 showing an alternative structure.

In an alternative arrangement, as shown in Figure 8, the adaptor block 17a is formed integrally with the inner metal leaf.

The groove 18 of each adaptor block 17 slidably engages the rib or flange 13. The wings 25 which form the side walls of the groove lie close against the sides of the rib or flange 13, and their ends just clear the parts 26 of the axle-box 11 flanking the rib or flange 13 as seen clearly in Figure 5.

The adaptor blocks are maintained in position by abutment against the ends of bolts 24 engaging screw threaded eyes 22 formed in extensions of the axle-box casting 11.

Adjustment of the bolts 24 will vertically raise or lower the adaptor blocks 17 with respect to the axle-box, and to maintain the bolts 24 in their adjusted position their heads are drilled and a locking bar 23 is passed through the heads or both bolts. Alternatively a lock nut could be provided for each bolt.

If it is desired to disconnect the axle-box 11 from the side member 10 it is necessary only to lift the side member, when the adaptor blocks 17 will be permitted to slide upwardly along and off the ribs 13 to leave the axle-box clear of the compound resilient elements 12.

In order to give further protection against canting of the metal leaves 15 the rubber blocks 14, except the innermost ones, are each of greater width and less height than their adjacent inner blocks. This construction also reduces any tendency of the metal leaves to bend under lateral loads.

I claim:

1. Resilient mounting for rail and like vehicles including a pair of compound resilient elements between the body or chassis frame of the vehicle and each wheel axle-box, each compound resilient element comprising angular rubber blocks and correspondingly shaped metal leaves to which the rubber blocks are surface bonded, the wings of which leaves and rubber blocks are inclined to one another at an angle not substantially exceeding a right angle, said compound resilient elements being arranged in the form of a V spring, the axle box being at the apex of the V, the joins of the wings of the metal leaves and rubber blocks of each compound resilient element being parallel, and a plane normal to the said joins being upwardly inclined from the axle box, the compound resilient elements thus forming the arms of the V for connection to said body or chassis frame of the vehicle.

2. Resilient mounting for rail and like vehicles as claimed in claim 1 wherein the center of at least one of the rubber blocks of each compound resilient element remote from the axle-box is offset or staggered in a vertical upward direction with respect to the center of a rubber block nearer to the axle-box.

3. Resilient mounting for rail and like vehicles as claimed in claim 1 wherein the center of each rubber block, except the innermost one of each compound resilient element is offset or staggered in a vertical upward direction with respect to the center of its preceding inner rubber block.

4. Resilient mounting for rail and like vehicles as claimed in claim 1 wherein at least one of the rubber blocks of each compound resilient element remote from the axle-box is of less height and of greater width than a rubber block nearer to the axle-box.

5. Resilient mounting for rail and like vehicles as claimed in claim 1 wherein each rubber block, except the innermost one of each compound resilient element is of less height and of greater width than its preceding inner block.

6. Resilient mounting for rail and like vehicles including a pair of compound resilient elements between the body or chassis frame and the fore and aft side respectively of each wheel axle-box, each compound resilient element comprising angular rubber blocks surface-bonded to correspondingly shaped metal leaves whose angle does not substantially exceed a right angle, each compound resilient element being secured at one end and connected to the axle-box at the other end in such manner that when assembled in the vehicle they form a V spring, the joins of the wings of the metal leaves and rubber blocks of each compound resilient element being parallel, and a plane normal to said joins being upwardly and outwardly inclined from the axle box to said frame in such manner that vertical loads are resisted by the rubber blocks in compression and shear, the center of each rubber block except the innermost one of each compound resilient element being offset upwardly with respect to the center of the adjacent rubber block nearer the axle box so that the resultant forces through the centers of pressure of all the rubber blocks in a compound resilient element lie in a straight line which is inclined at an acute angle to the said plane normal to the said joins.

7. Resilient mounting for rail and like vehicles as claimed in claim 6 in which each angular rubber block except the innermost one, of each compound resilient element is of less height and of greater width than its preceding inner rubber block and each metal leaf is correspondingly of greater width than the inner metal leaf immediately preceding it.

8. Resilient mounting for rail and like vehicles as claimed in claim 1 wherein the junction of the wings of each chevron-shaped rubber block and each chevron-shaped metal leaf of a compound resilient element is curved.

9. Resilient mounting for railway and like vehicles in which a V spring is arranged between the body or chassis frame and the axle box, the V spring comprising two assemblies, disposed in the form of a V, with the axle box at its apex, each assembly consisting of at least two rubber blocks of chevron shape surface-bonded to correspondingly shaped metal leaves, the included angle of which is not greater than a right angle, at least one of the rubber blocks in each assembly being stepped upwardly in relation to an adjacent rubber block nearer to the axle box, said upwardly stepped rubber block being of less height but of greater width than the said adjacent rubber block that is nearer the axle box.

10. Resilient mounting for rail and like vehicles as claimed in claim 1 wherein the axle box has a substantially vertical rib formed on each side and wherein the metal leaf of each compound resilient element adjacent to the axle box is secured to an adaptor block having means including a substantially vertical groove on one side for receiving and engaging said substantially vertical rib of the axle box to prevent relative lateral movement between the said metal leaf and the axle box.

11. Resilient mounting for rail and like vehicles as claimed in claim 10, the adaptor block having means including mutually inclined pressure surfaces for engaging the adjacent metal leaf of the compound resilient element.

12. Resilient mounting for rail and like vehicles as claimed in claim 1 wherein the axle box has a substantially vertical rib formed on each side and wherein each said compound resilient element has an adaptor block bonded to an adjacent one of said rubber blocks and said adaptor block has means including a substantially vertical groove on one side for receiving and engaging said substantially vertical rib of the axle box to prevent relative lateral movement between the said metal leaf and the axle box.

References Cited in the file of this patent

UNITED STATES PATENTS

| 2,216,715 | Ledwinka | Oct. 1, 1940 |
| 2,259,049 | Swan | Oct. 14, 1941 |
| 2,286,563 | Mussey | June 16, 1942 |
| 2,655,005 | Kinneman | Oct. 13, 1952 |

FOREIGN PATENTS

| 177,157 | Austria | Jan. 11, 1954 |
| 648,516 | Great Britain | Jan. 3, 1951 |